(12) United States Patent
Yao

(10) Patent No.: US 12,501,911 B1
(45) Date of Patent: Dec. 23, 2025

(54) ELECTRIC MEAT SHREDDING APPARATUS

(71) Applicant: Shanghai Xinqi Electronic Technology Co., Ltd., Shanghai (CN)

(72) Inventor: Guodong Yao, Shanghai (CN)

(73) Assignee: Shanghai Xinqi Electronic Technology Co., Ltd., Shanghai (CN)

( * ) Notice: Subject to any disclaimer, the term of this patent is extended or adjusted under 35 U.S.C. 154(b) by 0 days.

(21) Appl. No.: 19/070,735

(22) Filed: Mar. 5, 2025

(30) Foreign Application Priority Data

Jan. 24, 2025 (CN) .......................... 202520171803.7
Feb. 11, 2025 (CN) .......................... 202520213932.8

(51) Int. Cl.
*A22C 17/00* (2006.01)
*B02C 18/18* (2006.01)
*B02C 18/24* (2006.01)

(52) U.S. Cl.
CPC ........ *A22C 17/0006* (2013.01); *B02C 18/186* (2013.01); *B02C 18/24* (2013.01); *B02C 2018/188* (2013.01)

(58) Field of Classification Search
CPC ......... B26D 3/24; B02C 18/144; B02C 18/16; B02C 18/186
See application file for complete search history.

(56) References Cited

U.S. PATENT DOCUMENTS

| | | | | |
|---|---|---|---|---|
| 4,101,082 | A | * | 7/1978 | Mayer .................... A47J 42/26 310/43 |
| 4,390,133 | A | * | 6/1983 | Wanat .................... A47J 43/255 241/285.2 |
| 11,350,638 | B1 | * | 6/2022 | Mesa-Arias ............ B02C 25/00 |
| D1,039,925 | S | * | 8/2024 | He ................................ D7/693 |
| 2004/0177763 | A1 | * | 9/2004 | Robillard, III .......... A47J 42/38 99/286 |
| 2005/0009461 | A1 | * | 1/2005 | Palese .................... A22C 9/008 452/142 |
| 2006/0196334 | A1 | * | 9/2006 | Chen ........................ B26D 7/06 83/482 |
| 2007/0254578 | A1 | * | 11/2007 | Stewart .................. A22C 9/004 452/141 |
| 2011/0192928 | A1 | * | 8/2011 | Mandeville .......... A47J 43/0711 241/291 |
| 2012/0193460 | A1 | * | 8/2012 | Berger .................. E03C 1/2665 241/46.013 |

(Continued)

*Primary Examiner* — Sean M Michalski

(57) ABSTRACT

An electric meat shredding apparatus includes a first shredding assembly and a second shredding assembly, the first shredding assembly includes a first shredding member, the second shredding assembly includes a second shredding member, the first shredding member and the second shredding member cooperatively define a first chamber; the first shredding member is provided with a plurality of first spikes extending toward the second shredding member, and the second shredding member is provided with a plurality of second spikes extending toward the first shredding member; in the first chamber, the plurality of first spikes are staggered with the plurality of second spikes; the second shredding member further includes a drive member, the drive member is drivably connected to the second shredding member to drive the second shredding member to rotate relative to the first shredding member.

17 Claims, 11 Drawing Sheets

(56) References Cited

U.S. PATENT DOCUMENTS

| | | | |
|---|---|---|---|
| 2015/0290652 A1* | 10/2015 | Metaxatos | A22C 17/0006 241/199.12 |
| 2018/0161780 A1* | 6/2018 | Mesa-Arias | B02C 18/28 |
| 2019/0150459 A1* | 5/2019 | De Los Santos Gualque | B02C 18/145 |
| 2019/0269277 A1* | 9/2019 | Larose | A47J 42/34 |
| 2020/0154762 A1* | 5/2020 | Estrella | A24F 1/24 |
| 2021/0093124 A1* | 4/2021 | Aryanpanah | A47J 42/14 |
| 2022/0378085 A1* | 12/2022 | Hall | A47J 42/12 |
| 2023/0081670 A1* | 3/2023 | Rogers | F26B 25/22 241/65 |
| 2023/0120577 A1* | 4/2023 | Yancey | A61K 9/0014 424/449 |
| 2023/0284672 A1* | 9/2023 | Ambrose | A24B 7/00 |
| 2024/0245266 A1* | 7/2024 | Tognarelli | A01B 1/02 |
| 2025/0121524 A1* | 4/2025 | Xie | B26D 3/24 |

* cited by examiner

ELECTRIC MEAT SHREDDING APPARATUS

CROSS REFERENCE TO RELATED APPLICATIONS

The present application claims the priority of Chinese patent application No. 202520171803.7, filed on Jan. 24, 2025; Chinese patent application No. 202520213932.8, filed on Feb. 11, 2025.

FIELD

The present disclosure relates to the field of meat processing tools, and particularly to an electric meat shredding apparatus.

BACKGROUND

In the food processing filed, meat shredding is an important step in producing meat products such as shredded meat and meat floss. Currently, meat shredding is primarily processed manually or with manual tools.

Meat shredding by using manual tools is inefficient. Although some industrial equipment incorporates electric mechanical technology to automate the meat shredding process, these devices are typically large in size, expensive, and not suitable for a family or a small-scale catering establishment. Therefore, an easy-to-operate, efficient electric meat shredding apparatus is urgently needed for domestic use or small-scale catering applications.

SUMMARY

The present disclosure provides an electric meat shredding apparatus comprising: a first shredding assembly and a second shredding assembly, wherein the first shredding assembly comprises a first shredding member, the second shredding assembly comprises a second shredding member, the first shredding member and the second shredding member cooperatively define a first chamber; wherein the first shredding member is provided with a plurality of first spikes extending toward the second shredding member, and the second shredding member is provided with a plurality of second spikes extending toward the first shredding member; in the first chamber, the plurality of first spikes are staggered with the plurality of second spikes; the second shredding member further comprises a drive member, the drive member is drivably connected to the second shredding member to drive the second shredding member to rotate relative to the first shredding member.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

Figure 1:
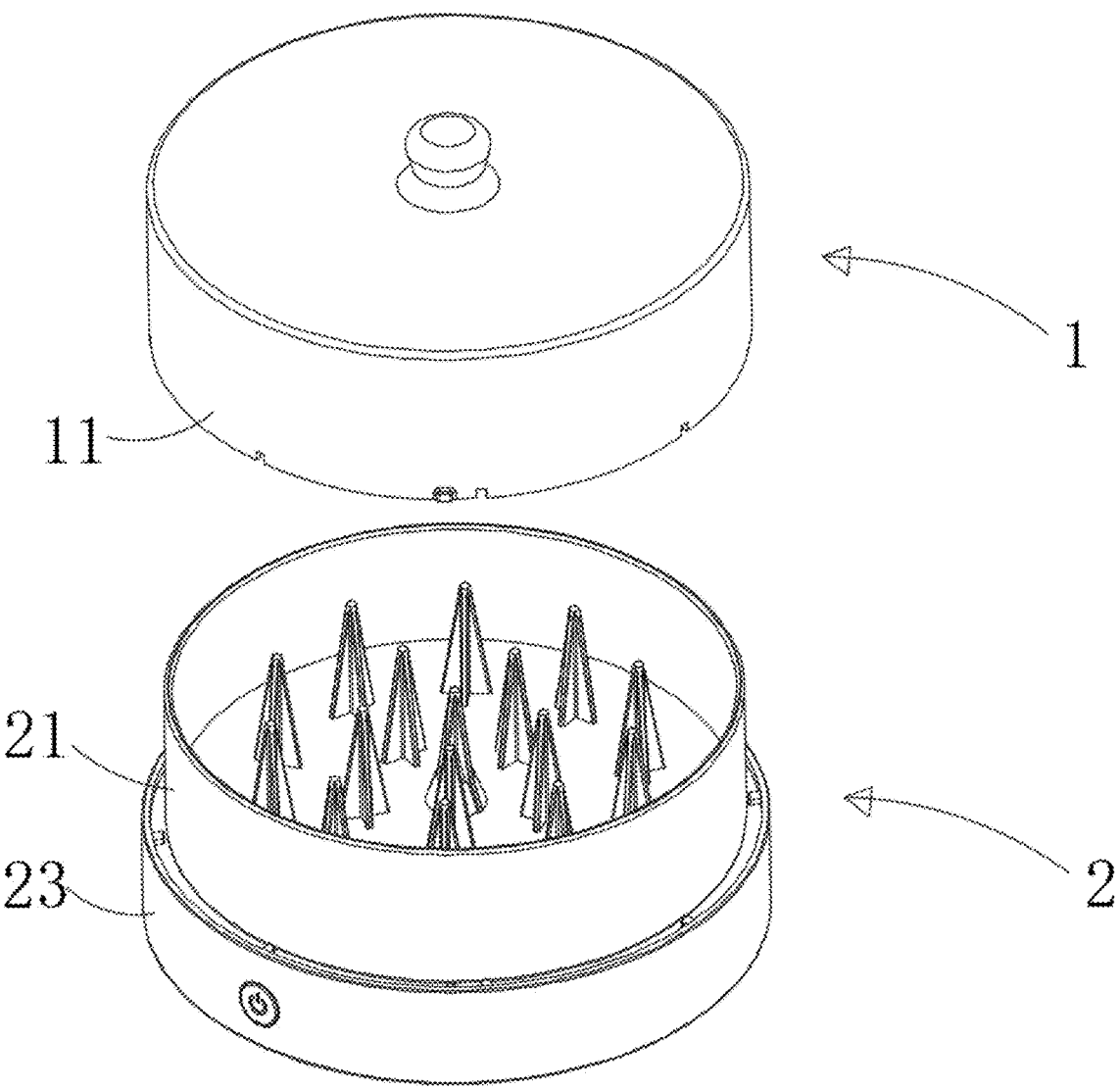
FIG. 1 is a structural schematic view of an electrical meat shredding apparatus according to an embodiment of the present disclosure.

REFERENCE NUMERALS IN THE DRAWINGS 1, first shredding assembly; 11, first shredding member; 110, first base; 111, first spikes; 1110, blades; 112, notch; 113, second limiting protrusion; 12, anti-slip member;
2, second shredding assembly; 21, second shredding member; 210, second base; 211, second spikes; 212, alignment slot; 22, drive member; 221, output shaft; 2211, polygonal column; 23, receiving box; 231, bottom surface; 232, top surface; 233, first limiting protrusion; 234, limiting slot; 235, pressing contact point;
3, first chamber; 4, meat placing tray; 41, through holes; 5, mounting gap; 6, battery.

DETAILED DESCRIPTION

Unless otherwise defined, all technical and scientific terms used herein have the same meaning as commonly understood by those skilled in the art to which this disclosure belongs. The terms used in the description of the application herein are intended for describing particular embodiments only and are not intended to limit the present disclosure. In the description, claims, and the above drawings of the present disclosure, the terms "comprising" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in connection with an embodiment may be included in at least one embodiment of the present disclosure. The appearance of the phrase at various places in the specification does not necessarily refer to the same embodiment, nor is it a separate or alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Figure 2:
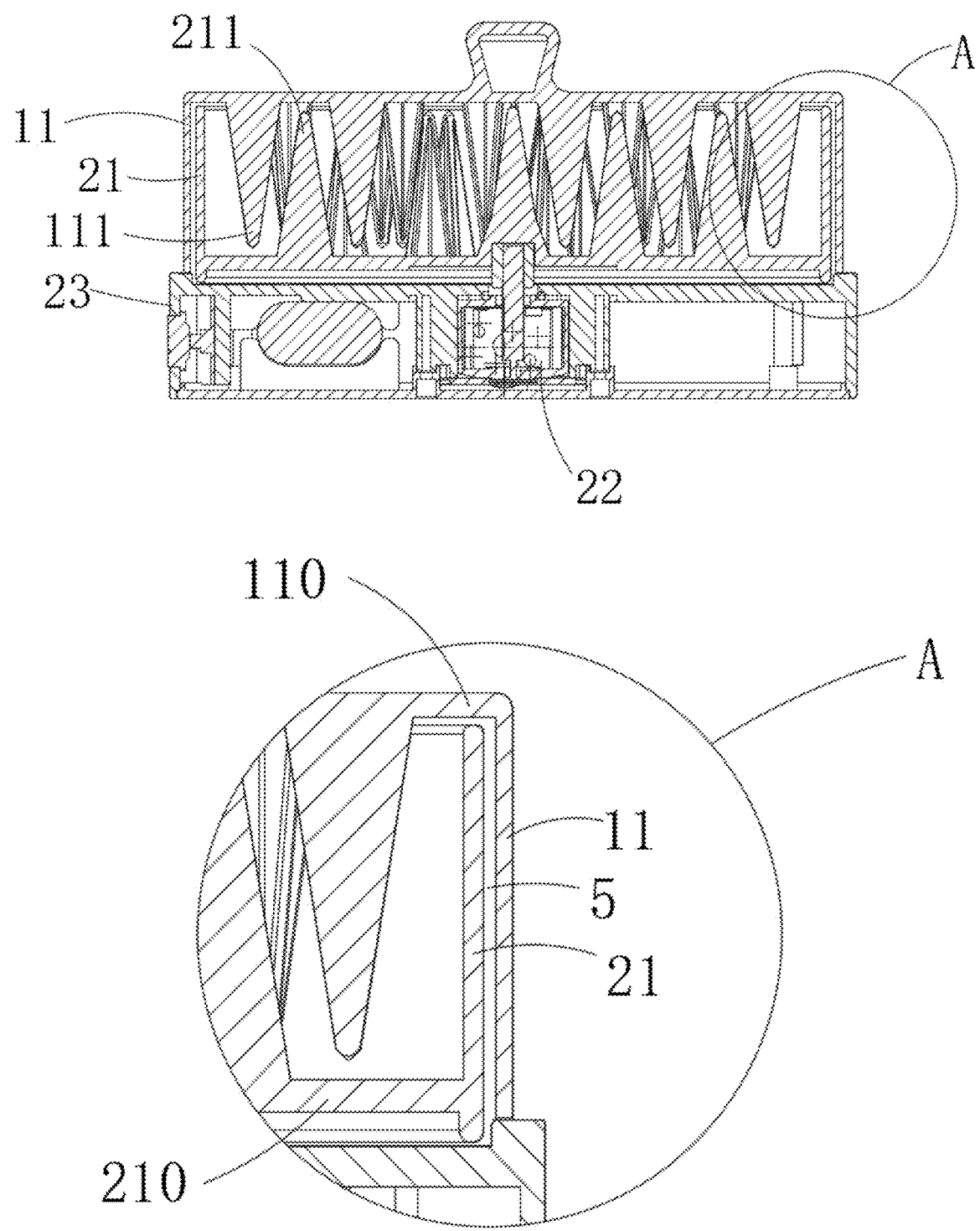
FIG. 2 is a cross-sectional view of an electric meat shredding apparatus.

As shown in FIGS. 1 and 2, the present disclosure provides an electric meat shredding apparatus, includes the first shredding member 11, and the second shredding assembly 2. The first shredding member 11 and the second shredding member 21 cooperatively define a first chamber 3. The first shredding member 11 includes a first base 110 and a plurality of first spikes 111. The second shredding assembly 2 includes a second shredding member 21. The plurality of first spikes 111 extends from the first base 110 and toward the second shredding member 21. The second shredding member 21 includes a second base 210 and a plurality of second spikes 211 extending from the second base 210 and toward the first base 110. In the first chamber 3, the plurality of first spikes 111 are staggered with the plurality of second spikes 211. The second shredding assembly 2 further includes a drive member 22, which is connected to the second shredding member 21 to drive the second shredding member 21 to rotate relative to the first shredding member 11.

In some embodiments, each of the first shredding member 11 and the second shredding member 21 is configured as a circular disc or a circular housing. The plurality of first spikes 111 are distributed in a circular array about a circular center of the first shredding member 11, and the plurality of second spikes 211 are distributed in a circular array about a center of the circle of the second shredding member 21.

It should be clarified that a specific structure of the first shredding member 11 or the second shredding member 21 is not limited to a circular shape, but may also include other shapes, such as polygonal, elliptical, or irregular shapes, and so on, as long as the first shredding member 11 and the second shredding member 21 can rotate relative to each other without interference.

The first shredding member 11 and the second shredding member 21 may be connected to each other by thread connection to cooperatively define the first chamber 3. It should be understood, besides thread connection, other connection methods can also be adopted, such as interference fit, snap-fit, etc.

In an embodiment, as shown in FIG. 2, a central axis of the first shredding member 11 coincides with a central axis of the second shredding member 21. The first shredding member 11 and the second shredding member 21 are assembled with each other along a vertical direction, and the first spikes 111 and the second spikes 211 are arranged oppositely in the vertical direction. The first spikes 111 are evenly distributed on the first base 110; correspondingly, the second spikes 211 are evenly distributed on the second base 210. To prevent interference or collisions between the first spikes 111 and the second spikes 211 when the second shredding member 21 is rotating relatively to the first shredding member 11, the first spikes 111 are positioned to be staggered with the second spikes 211, that is, vertical projections of the plurality of first spikes 111 are staggered with vertical projections of the plurality of second spikes 211. In this way, the first spikes 111 and the second spikes 211 alternately process the meat during rotation, such that meat shredding is achieved.

Specifically, staggering between the first spikes 111 and the second spikes 211 may be achieved in the following manner. The first spikes 111 and the second spikes 211 are arranged in circular arrays around the circular center of the first shredding member 11 and the second shredding member 21, respectively, and a radius of each circular array formed by the first spikes 111 is different to a radius of each circular array formed by the second spikes 211.

It should be clarified that the first spikes 111 and the second spikes 211 may be arranged in different manners in other embodiments, such as along a spiral path with a rotational angle offset between adjacent spikes, as long as the first spikes 111 and the second spikes 211 can rotate relative to each other without interference.

Figure 3:
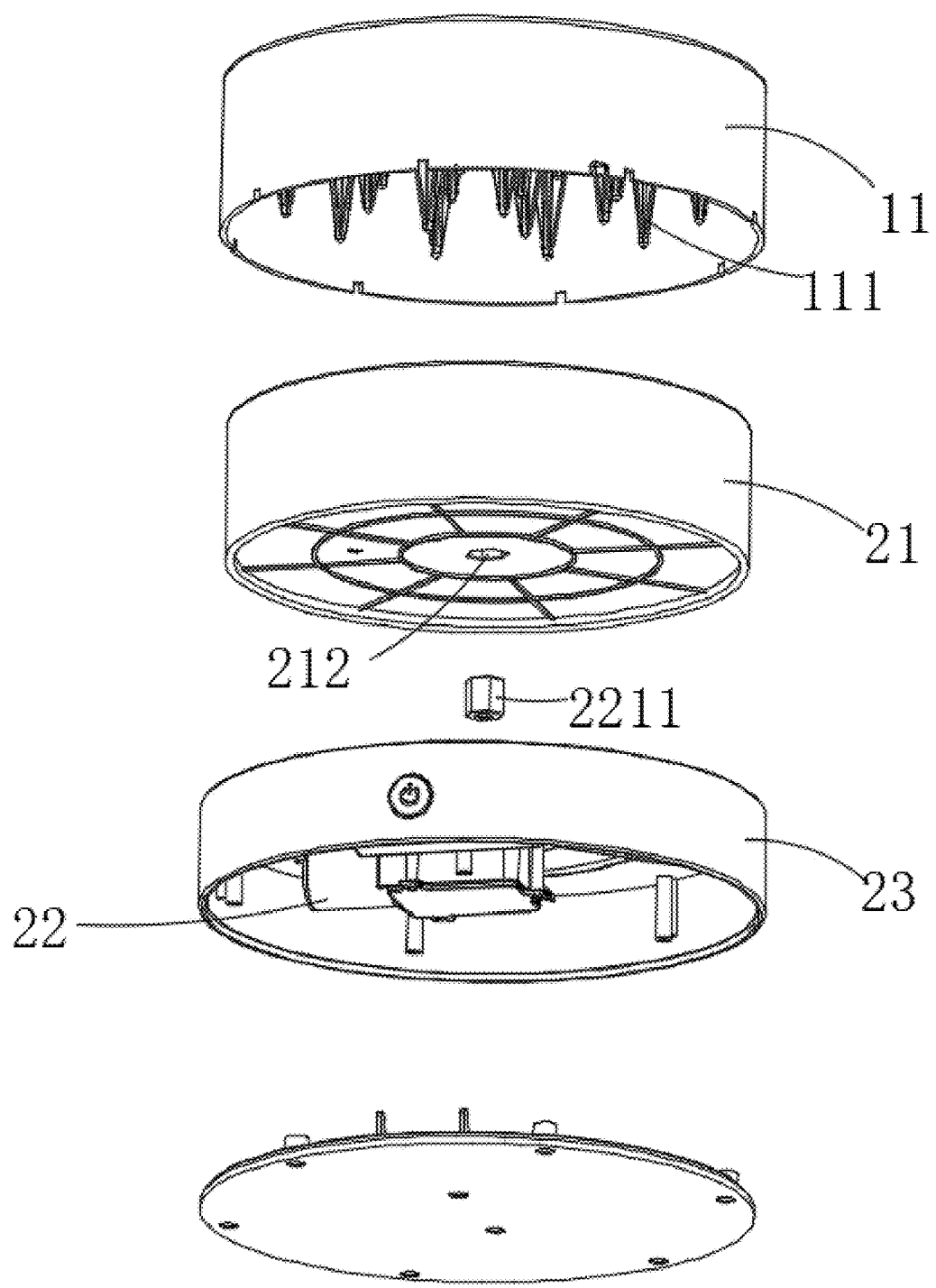
FIG. 3 is an exploded views of an electrical meat shredding apparatus according to an embodiment of the present disclosure.

As shown in FIG. 3, the drive member may be a motor, an output shaft 221 of the motor is connected to the center of the second shredding member 21. After starting the motor, a power of the motor is transferred to the second shredding member 21 through the output shaft 221, driving the second shredding member 21 and the second spikes 211 to rotate relative to the first shredding member 11 and the first spikes 111. During rotation, the first spikes 111 and the second spikes 211 act alternately on the meat to exert a tearing force on the meat, so that the meat can be torn into shreds in a small size quickly and evenly in the first chamber 3. Driving caused by the motor enhances the efficiency of the meat shredding process and ensures that the meat is shredded evenly.

In some embodiments, as shown in FIG. 2, a mounting gap 5 is defined between the first shredding member 11 and the second shredding member 12 to prevent interference between the first shredding member 11 and the second shredding member 21 during the rotation.

In some embodiments, as shown in FIG. 3, the second shredding assembly 2 includes a receiving box 23, the drive member 22 is mounted in the receiving box 23; the output shaft 221 of the drive member 22 extends out of the receiving box 23 and is connected to the second shredding member 21 to drive the second shredding member 21 to rotate relative to the receiving box 23.

The receiving box 23 provides an enclosed chamber in which the drive member 22 can be received. The receiving box 23 isolates meat debris, liquids, and other impurities that could damage the motor, thereby ensuring operation stability of the motor and extending a service life of the motor. The output shaft 221 of the drive member 22 extends out of the receiving box 23 and is connected to the second shredding member 21, enabling the second shredding member 21 to be detachable. Specifically, after the meat shredding operation, the user can remove the second shredding member 21 from the electric meat shredding apparatus, allowing the second shredding member 21 to be washed separately, and preventing water from reaching electronic components arranged inside the receiving box 23 during washing.

After the drive member 22 is started, the drive member 22 drives the second shredding member 21 to rotate. High-speed rotation of the second shredding member 21 may generates airflow within the mounting gap 5, and the airflow may influence the first shredding member 11, causing the first shredding member 11 to rotate. In addition, when the first shredding member 11 is mounted by the user, accidental contact between the first shredding member 11 and the second shredding member 21 may occur to cause the first shredding member 11 to rotate as the second shredding member 21 rotates. To eliminate such effects and to ensure the first shredding member 11 to remain stationary relative to the second shredding member 21 as the second shredding member 21 rotates, a circumferential limit is provided between the first shredding member 11 and the receiving box 23.

The circumferential limit can be achieved by various manners, such as engagement of protrusions and slots, threaded connections, clamping structures, and so on.

In other embodiments, the circumferential limit may not be arranged between the first shredding member 11 and the receiving box 23. Instead, the first shredding member 11 may remain stationary while the second shredding member 21 rotates. For example, a weight of the first shredding member 11 may be increased, allowing the first shredding member 11 to be pressed against the receiving box 23 by gravity, such that the influence caused by the airflow or external forces may be eliminated. Alternatively, a rubber pad or a silicone layer may be arranged at a bottom of the first shredding member 11, to enhance friction between the first shredding member 11 and the receiving box 23, preventing any unexpected rotation.

Figure 4:
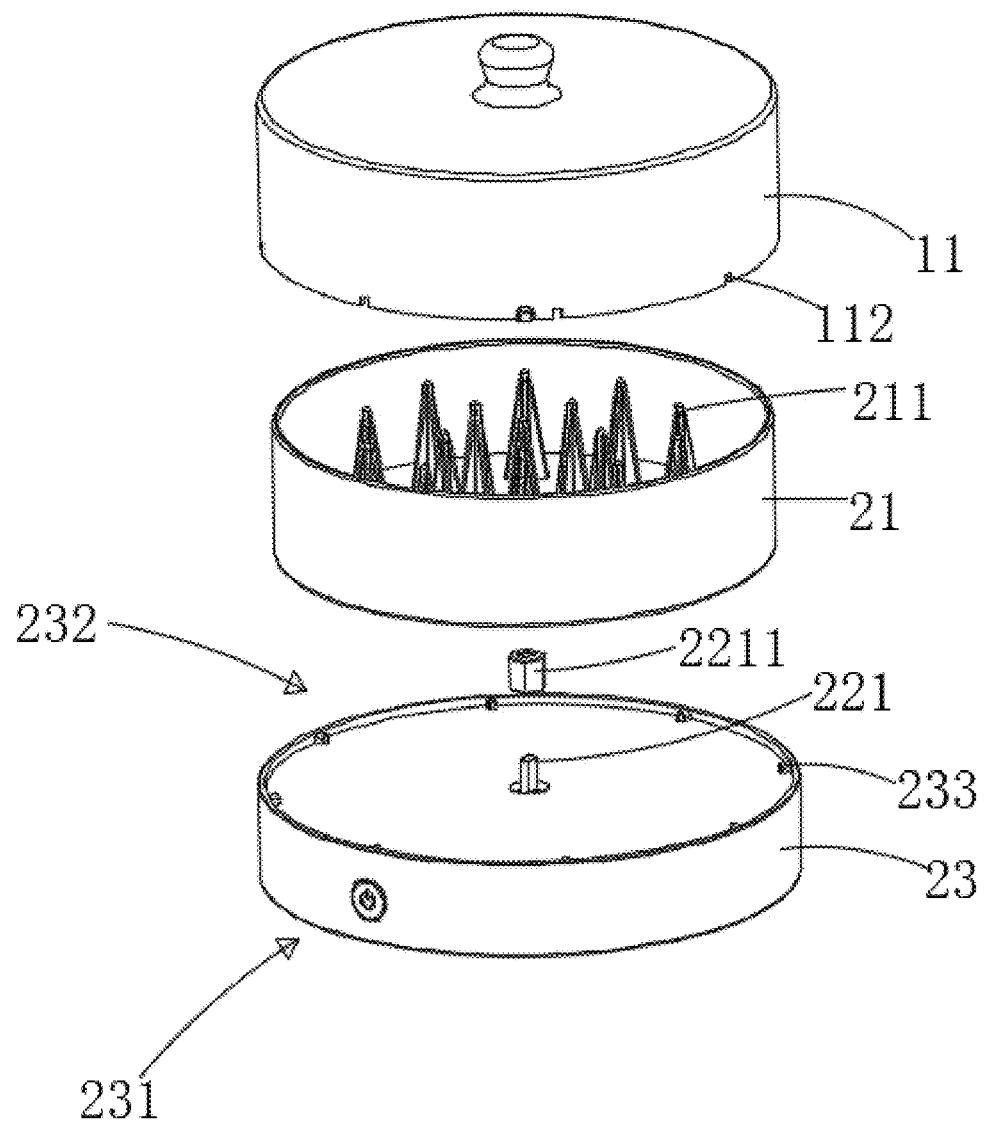
FIG. 4 is another exploded view of an electrical meat shredding apparatus according to an embodiment of the present disclosure.
Figure 5:
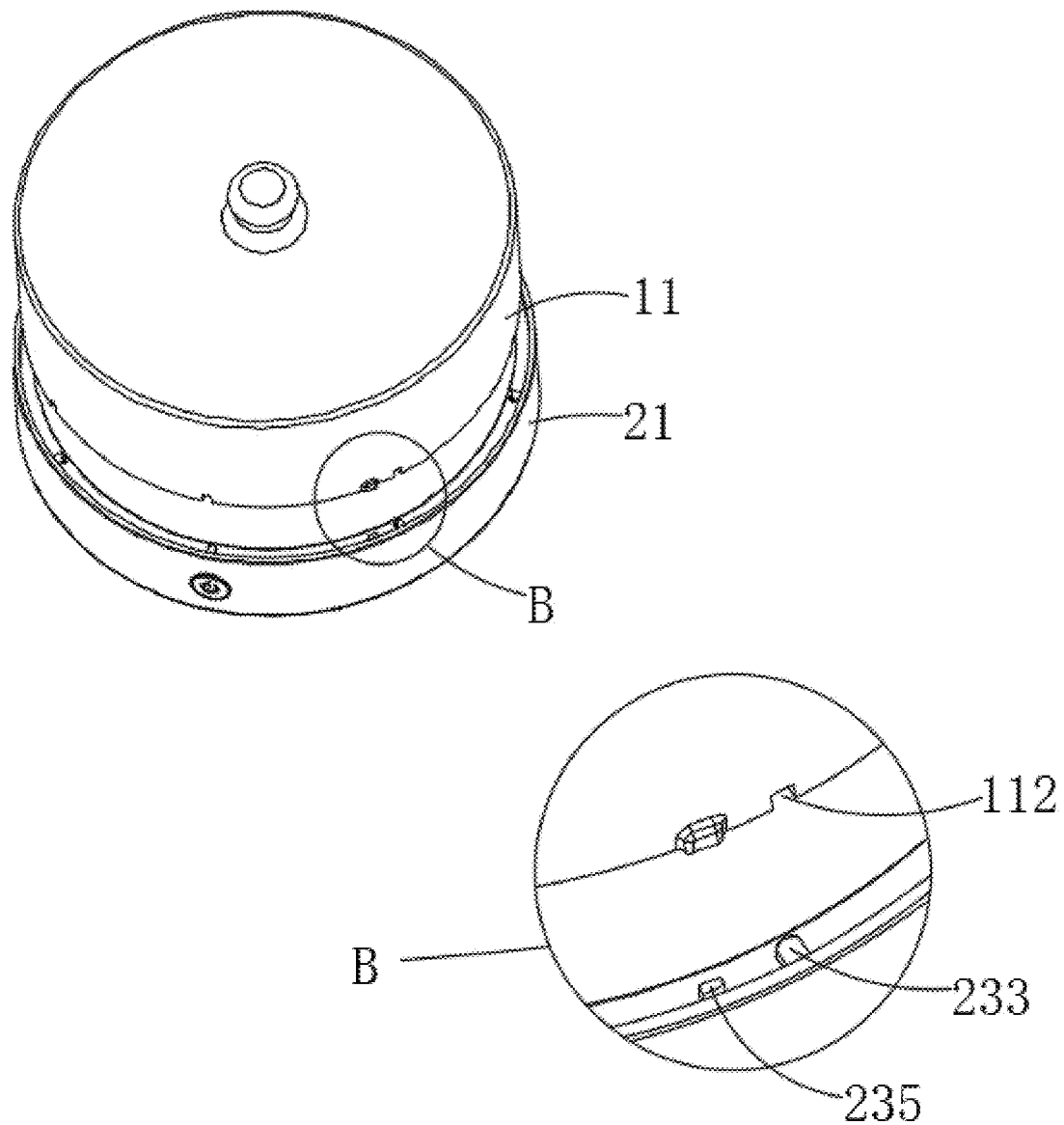
FIG. 5 is a third exploded view of an electrical meat shredding apparatus according to an embodiment of the present disclosure.

In some embodiments, as shown in FIGS. 3 to 5, the receiving box 23 includes a bottom surface 231 and a top surface 232 opposite to the bottom surface 231, the top surface 232 is closer to the first shredding member 11 than the bottom surface 231 is, and the second shredding member 21 is mounted on the top surface 232 of the receiving box 23.

In some embodiments, the top surface 232 is arranged with a first limiting protrusion 233, a lower edge of an outer wall of the first shredding member 11 defines a notch 112; a bottom of the first shredding member 11 defines an opening. The first shredding member 1 envelops the second shredding member 21 from top to bottom and abuts against the receiving box 23. The first limiting protrusion 233 is received in the notch 112.

As shown in FIGS. 3 to 5, in an embodiment, the first shredding member 11 is positioned on the top, while the second shredding member 21 is positioned at the bottom and rotates relative to the first shredding member 11. The first limiting protrusion 233 is received within the notch 112 to achieve the circumferential limit between the first shredding member 11 and the receiving box 23.

Additionally, a single contact point may be worn by a concentrated force, therefore, to prevent failure of the circumferential limit, a plurality of first limiting protrusions 233 and a plurality of notches 112 can be provided to distribute the force.

Figure 6:
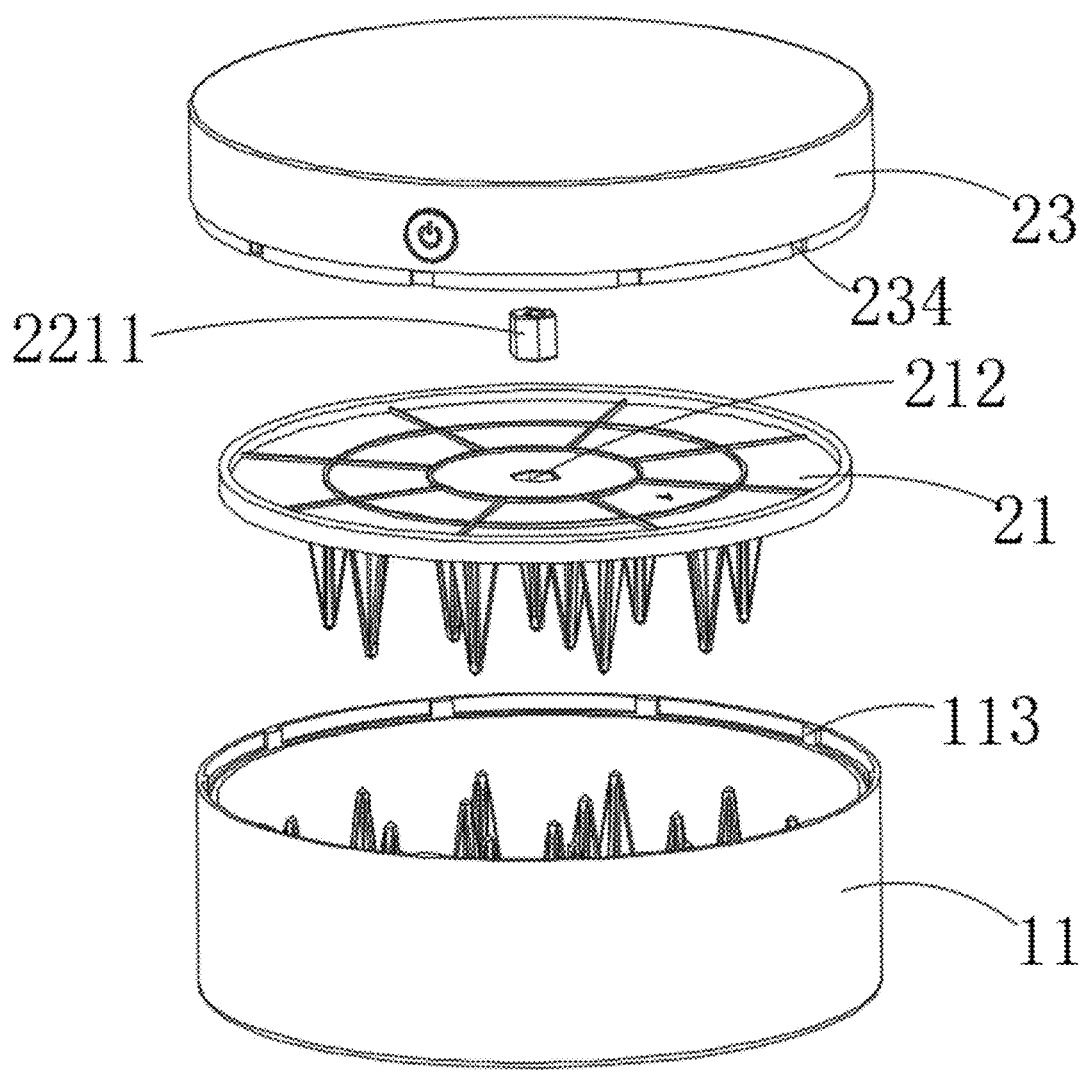
FIG. 6 is an exploded view of an electrical meat shredding apparatus according to another embodiment of the present disclosure.
Figure 7:
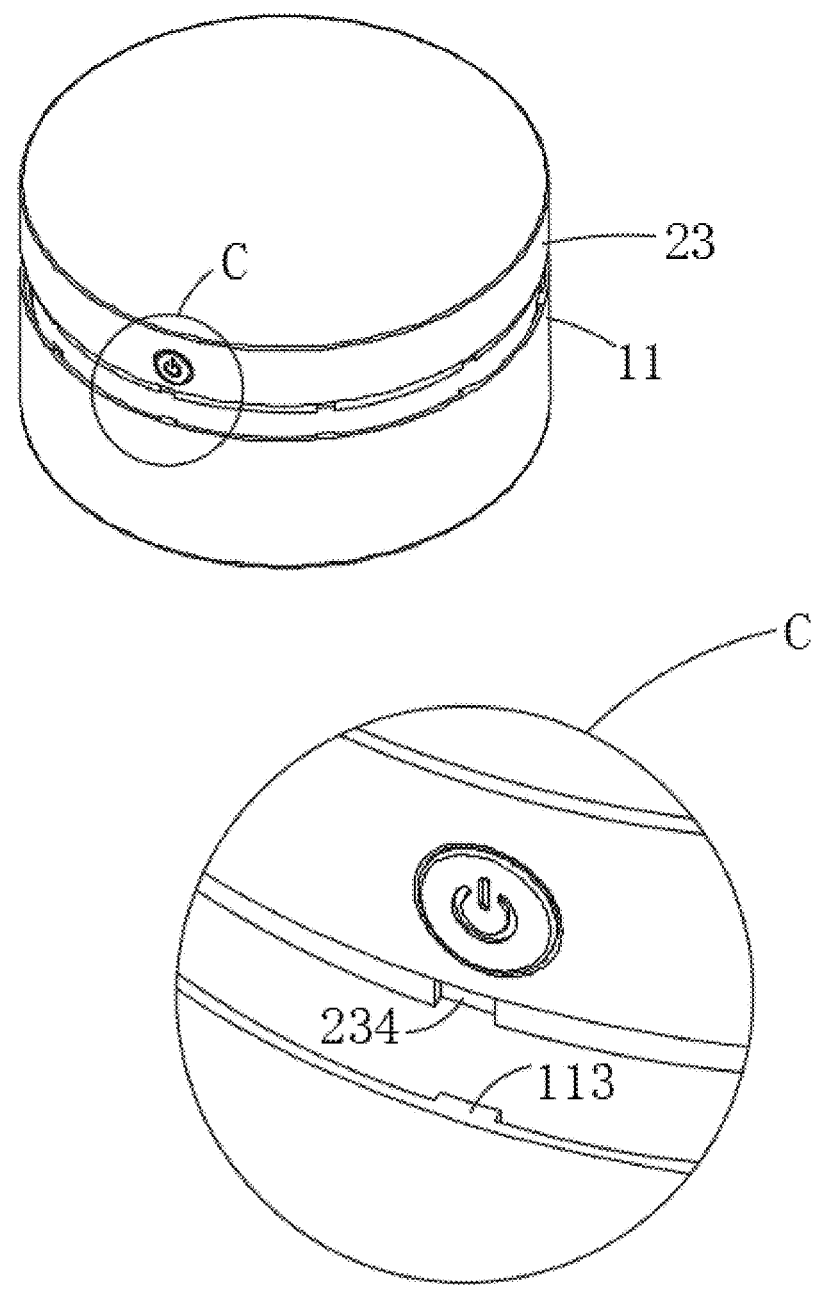
FIG. 7 is another exploded view of an electrical meat shredding apparatus according to another embodiment of the present disclosure.
Figure 8:
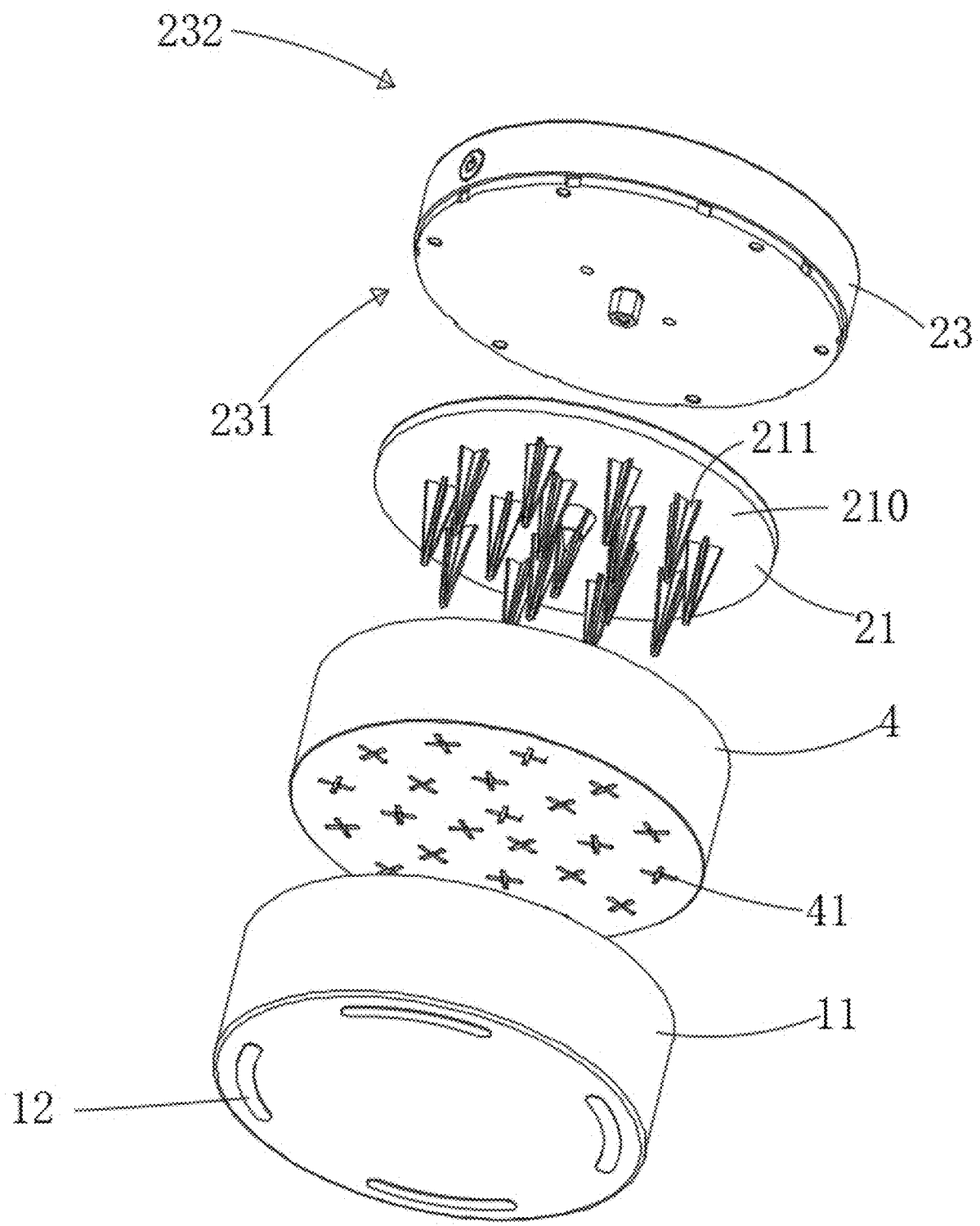
FIG. 8 is a third exploded view of an electrical meat shredding apparatus according to another embodiment of the present disclosure.

In some embodiments, as shown in FIGS. 6 to 8, the receiving box 23 includes a bottom surface 231 and a top surface 232 opposite to the bottom surface 231, the bottom surface 231 is closer to the first shredding member 11 than the top surface 232 is, and the second shredding member 21 is mounted on the bottom surface 231 of the receiving box.

A lower part of the outer wall of the receiving box 23 defines a limiting slot 234, the top of the first shredding member 11 defines an opening, an inner wall of the first shredding member 11 is arranged with a second limiting protrusion 113; the receiving box 23 is mounted on the first shredding member 11, with the second limiting protrusion 113 received in the limiting slot 234.

As shown in FIGS. 6 to 8, in another embodiment, the first shredding member 11 is positioned at the bottom, while the second shredding member 21 is positioned on the top, and the second shredding member 21 rotates relative to the first shredding member 11. The second shredding member 21 and the receiving box 23 are assembled as a one-piece and integrated assembly, which is mounted, from top to bottom, on the box-shaped first shredding member 11. Specifically, the inner wall of the first shredding member 11 is arranged with a resting platform, and the receiving box 23 can be placed on the resting platform. The circumferential limit between the first shredding member 11 and the receiving box 23 is achieved by engaging the second limiting protrusion 113 into the limiting slot 234. To prevent the failure of the circumferential limit due to a single contact point, a plurality of second limiting protrusions 113 and a plurality of limiting slots 234 may be provided.

In some embodiments, as shown in FIG. 8, the first shredding assembly 1 includes an anti-slip member 12 which is disposed at the bottom of the first shredding member 11 and is configured to prevent movement of the first shredding assembly 1.

After starting the electric meat shredding apparatus, vibration of the drive member 22 or external forces may cause the first shredding member 11 to move. In an embodiment, the anti-slip member 12 includes a rubber pad. The rubber pad is fixedly arranged at the bottom of the first shredding member 11 by adhesive bonding or embedding. The rubber pad increases friction between the first shredding member 11 and a placement platform, preventing the movement of the first shredding assembly 1. In another embodiment, the anti-slip member 12 may be a suction disk, adsorbed to the placement platform due to a negative pressure, such that the first shredding member 11 can be tightly connected to the placement platform, and the movement of the first shredding member 11 caused by vibration or mis-operations may be avoided. Alternatively, the anti-slip member 12 can be a magnet, which generates magnetic attraction when the placement platform is made of metal, and the first shredding member 11 is fixed by the magnetic attraction.

It should be clarified that, the anti-slip member 12 may be omitted from the first shredding assembly 1. For example, the weight of the first shredding member 11 may be increased to improve stability of the first shredding member 11 being placed on the placement platform, such that the first shredding member 11 may be resistant to vibrations and external forces. Alternatively, the electric shredding apparatus is a handheld electric shredding apparatus, the user can manually apply a pressure to fix the first shredding member 11 in place, in this way, there is no need for arranging the extra anti-slip member 12.

In some embodiments, as shown in FIGS. 3 to 4, a portion of the output shaft 221 that extends out of the receiving box 23 is sleeved by a polygonal column 2211, the second shredding member 21 defines an alignment slot 212 on a side of the second shredding member 21 that contacts the output shaft 221; a shape of the alignment slot 212 is adapted to an outer contour of the polygonal column 2211, allowing the polygonal column 2211 to be embedded into the alignment slot 212.

The output shaft 221 of the drive member 22 is typically configured as a semi-cylinder. Accordingly, the second shredding member 21 defines a semi-circular slot to be mated with the semi-cylinder, such that the output shaft 221 can drive the second shredding member 21 to rotate. However, as the electric meat shredding apparatus is used frequently, a straight edge of the semi-circular slot may be gradually worn, leading to failure of circumferential limiting between the second shredding member 21 and the output shaft 221, affecting the operation of the apparatus. To overcome this problem, the polygonal column 2211 (such as triangular, quadrilateral, pentagonal, and so on) is arranged to sleeve the portion of the output shaft 221 that extends out of the receiving box 23. In this way, failure of the circumferential limit caused by worn can be prevented, and increased friction between the output shaft 221 and the second shredding member 21 is provided to avoid relative sliding between the output shaft 221 and the second shredding member 21.

It should be clarified that, coupling between the polygonal column 2211 and the alignment slot 212 provided in the above embodiment is a preferred embodiment. When the output shaft 221 is configured as a non-circular shape, such as being polygonal or having flat surfaces, the output shaft 221 can directly be inserted into a corresponding hole of the second shredding member 21.

Figure 9:
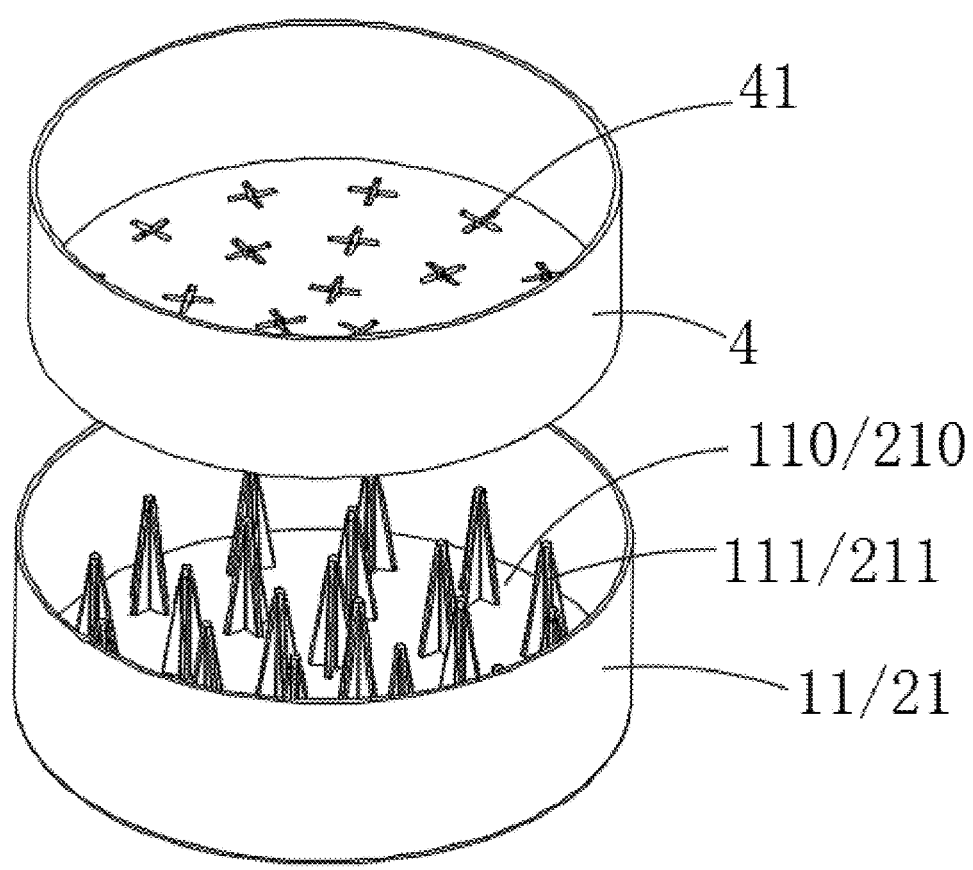
FIG. 9 is a structural schematic view of a meat placing tray according to an embodiment of the present disclosure.

In some embodiments, as shown in FIG. 9, the electric meat shredding apparatus includes a meat placing tray 4, a plurality of through holes 41 are defined in a bottom of the meat placing tray 4, allowing the first spikes 111 or the second spikes 211 to pass through, such that the meat placing tray 4 is detachably mounted on the first shredding member 11 or the second shredding member 21.

Sizes and positions of the through holes 41 in the meat placing tray 4 are matched with sizes and positions of the first spikes 111 or the second spikes 211, and a size of each through hole 41 is larger than a size of a respective one of the plurality of first spikes 111 or a size of a respective one of the plurality of second spikes 211 to ensure the meat placing tray 4 to be assembled smoothly with the first shredding member 11 or the second shredding member 21.

When using the electric meat shredding apparatus, the user assembles the meat placing tray 4 onto one of the first shredding member 11 and the second shredding member 21 located at a lower position, then places the meat on the meat placing tray 4. After the meat shredding procedure, the user can remove the meat placing tray 4 with the shredded meat placed on the meat placing tray 4, without using any tool to extract the shredded meat from the spikes. In this way, the electric meat shredding apparatus can be used more conveniently and can be cleaned more easily as less meat left on the spikes. It should be clarified that, the electric meat shredding apparatus can be used without arranging the meat placing tray 4. The meat placing tray 4 is mounted for collecting the shredded meat, enabling the electric meat shredding apparatus to be cleaned more easily. Arranging or omitting the meat placing tray 4 does not affect the assembly or operation of other components of the electric meat shredding apparatus, and does not have a substantial impact on the shredding function of the first shredding member 11 and the second shredding member 21.

In some embodiments, the electric meat shredding apparatus includes a detection module and a control module, the detection module is mounted on the first shredding assembly 1 or the second shredding assembly 2 to detect whether the first shredding member 11 and the second shredding member 21 are separated from each other; the control module is electrically connected to the detection module and the drive member 22, and the control module controls the drive member 22 to stop operating when the first shredding assembly 1 and the second shredding assembly 2 are separated from each other.

After apparatus stars, the shredding operation can be achieved only when the first shredding assembly 1 and the second shredding assembly 2 are in contact with each other. When the first shredding assembly 1 and the second shredding assembly 2 are separated from each other, the detection module detects the separation, generates a feedback signal, and sends the feedback signal to the control module. Upon receiving the feedback signal, the control module immediately controls the drive member 22 to slow down or stop operating, to avoid any injury to users or damage to the apparatus by an accidental operation.

The detection module may be a contact switch or a sensing device.

In an embodiment, the contact switch is a mechanical switch which achieves conduction or disconnection of a circuit through a physical contact. That is, the conduction of the circuit corresponds to the drive member 2 being in an operating state, while the disconnection of the circuit corresponds to the drive member 22 stopping operating. The contact switch has a pressing contact point 235. A position of the pressing contact point 235 may be changed by an external force, so as to achieve the conduction or disconnection of the circuit.

Specifically, as shown in FIG. 5, the pressing contact point 235 is mounted at a side of the receiving box 23 that contacts the first shredding member 1 and is connected to an elastic structure. When the first shredding member 11 is in contact with the receiving box 23, that is, when the first shredding assembly 1 and the second shredding assembly 2 are in contact with each other, the first shredding member 11 exerts a pressure on the pressing contact point 235 to conduct the circuit, such that the drive member 22 can operate normally. In contrast, when the first shredding member 11 separates from the receiving box 23, that is, when the first shredding assembly 1 separates from the second shredding assembly 2, the pressing contact point 235 is no longer subjected to the pressure and returns to an initial position, the circuit is disconnected, and the drive member 22 stops operating.

In another embodiment, the detection module may be the sensing device, such as an optoelectronic sensor or an electromagnetic sensor. The optoelectronic sensor detects the contact between the first shredding assembly 1 and the second shredding assembly 2 based on reflection or blocking of a light beam. When the first shredding assembly 1 and the second shredding assembly 2 are in contact with each other, the light beam of the optoelectronic sensor is transmitted stably, the drive member 22 operates normally. When the first shredding assembly 1 and the second shredding assembly 2 are separated from each other, an optoelectronic signal changes. The control module, after receiving the abnormal signal, stops the drive member 22. Similarly, the electromagnetic sensor detects the contact between the first shredding assembly 1 and the second shredding assembly 2 by detecting a change in a magnetic field and transmits operation instructions of the drive member 22 to the control module.

In some embodiments, the electric meat shredding apparatus includes a rotation speed adjustment module, which is electrically connected to the control module and the drive member to adjust a rotation speed of the drive member 22.

The rotation speed adjustment module may be a mechanical speed control device, such as a speed control knob or button. Alternatively, the rotation speed adjustment module may be an electronic speed control device, such as a touch screen or a sliding touch pad.

The mechanical speed control device takes a variable resistor to adjust a current or a voltage. When the user rotates the speed control knob or presses the speed control button, a resistance value changes, thereby changing the current or the voltage. In this way, different powers are supplied to the drive member 22, and the rotation speed of the drive member 22 is adjusted.

The electronic speed control device generates different electronic signals based on an operation performed by the user on the touch screen or the sliding touch pad and transmits the electronic signals to the control module to adjust the rotation speed of the drive member 22.

In other embodiments, the rotation speed adjustment module may be omitted from the electric meat shredding apparatus, and in this case, the drive member 22 rotates at a constant rotation speed.

Figure 10:
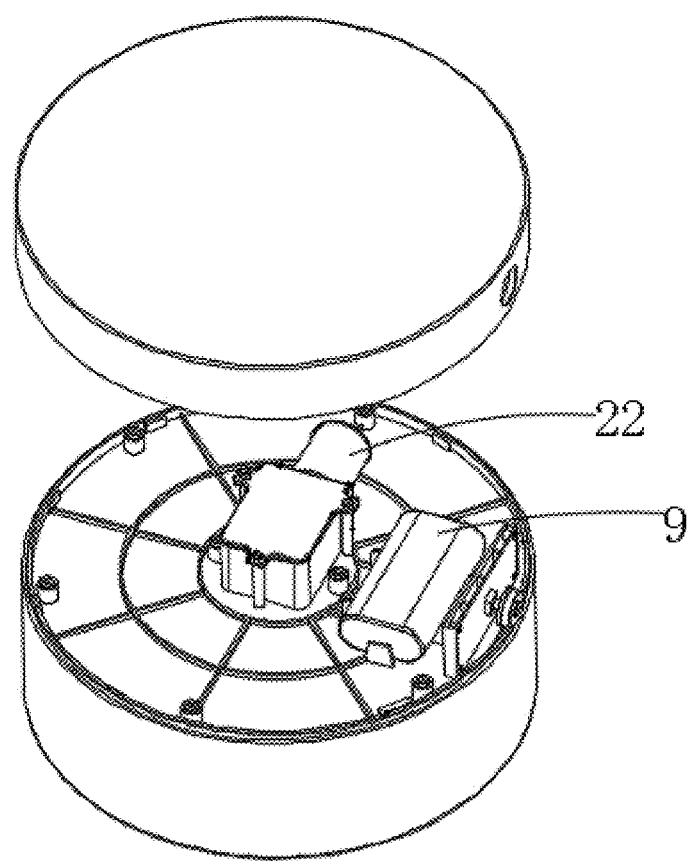
FIG. 10 is an installation schematic view of a battery and a drive member according to an embodiment of the present disclosure.

In some embodiments, as shown in FIG. 10, the electric meat shredding apparatus includes a battery 6, which is mounted inside the receiving box 23 and supplies power to the drive member 22.

The battery 6 may be a rechargeable battery, such as a lithium battery or a nickel-metal hydride battery, the rechargeable battery can be recharged via a power adapter or a USB port. Alternatively, the battery 6 may be a replaceable battery. Both the rechargeable battery and the replaceable battery is electrically connected to the control module and the drive member 22 to provide power thereto. It should be clarified that, the battery 6 may be omitted from the electric meat shredding apparatus, an external power source can also supply the power to the apparatus.

In some embodiments, the first shredding member 11 and/or the second shredding member 21 are made of a light-transmitting material, which allows the user to observe a shredding state of the meat. The light-transmitting material may be plastics or glass.

Figure 11:
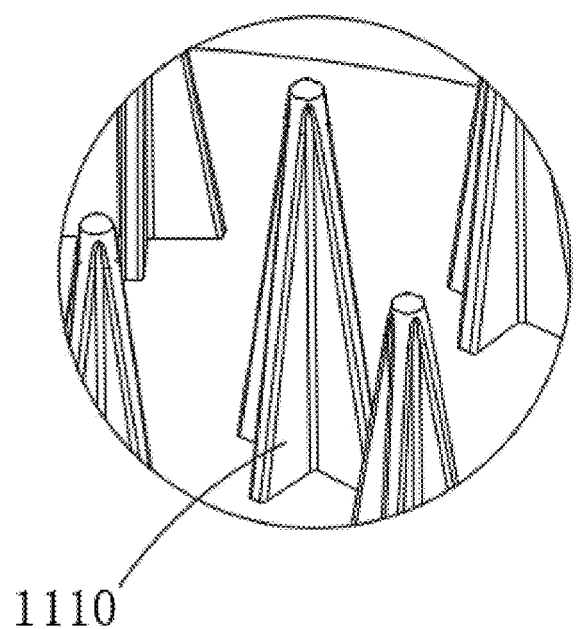
FIG. 11 is a structural schematic view of the blades according to an embodiment of the present disclosure.

In some embodiments, as shown in FIG. 11, each of the first spikes 111 and the second spikes 211 includes a plurality of blades 1110, and the plurality of blades 1110 intersect with each other at the central axis of the first spike 111 or the second spike 211. The plurality of blades 1110 allows each spike to have more cutting surfaces, such that the meat can be shredded more evenly.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. An electric meat shredding apparatus, comprising:
a first shredding assembly and a second shredding assembly,
wherein the first shredding assembly comprises a first shredding member, the second shredding assembly comprises a second shredding member, the first shredding member and the second shredding member cooperatively define a first chamber; wherein the first shredding member is provided with a plurality of first spikes extending toward the second shredding member, and the second shredding member is provided with a plurality of second spikes extending toward the first shredding member; in the first chamber, the plurality of first spikes are staggered with the plurality of second spikes; the second shredding member further comprises a drive member, the drive member is drivably connected to the second shredding member to drive the second shredding member to rotate relative to the first shredding member;
wherein the second shredding assembly comprises a receiving box, the drive member is mounted in the receiving box; an output shaft of the drive member extends out of the receiving box and is connected to the second shredding member to drive the second shredding member to rotate relative to the receiving box;
wherein the first shredding member is connected to the receiving box, and circumferential limit is provided between the first shredding member and the receiving box.

2. The electric meat shredding apparatus according to claim 1, wherein each of the first shredding member and the second shredding member is a circular disc or a circular housing; the plurality of first spikes are distributed in a circular array about a circular center of the first shredding member, and the plurality of second spikes are distributed in a circular array about a circular center of the second shredding member.

3. The electric meat shredding apparatus according to claim 1, wherein a mounting gap is defined between the first shredding member and the second shredding member.

4. The electric meat shredding apparatus according to claim 1, wherein the receiving box comprises a bottom surface and a top surface opposite to the bottom surface, the top surface is disposed closer to the first shredding member than the bottom surface is, and the second shredding member is mounted on the top surface of the receiving box.

5. The electric meat shredding apparatus according to claim 4, wherein the top surface is arranged with a first limiting protrusion, a lower edge of an outer wall of the first shredding member defines a notch; a bottom of the first shredding member defines an opening, the first shredding member envelops the second shredding member from top to bottom and abuts against the receiving box, the first limiting protrusion is received in the notch.

6. The electric meat shredding apparatus according to claim 1, wherein the receiving box comprises a bottom surface and a top surface opposite to the bottom surface, the bottom surface is disposed closer to the first shredding member than the top surface is, and the second shredding member is mounted on the bottom surface of the receiving box.

7. The electric meat shredding apparatus according to claim 6, wherein a lower portion of an outer wall of the receiving box defines a limiting slot, a top of the first shredding member defines an opening, an inner wall of the first shredding member is arranged with a second limiting protrusion; the receiving box is mounted on the first shredding member, the second limiting protrusion is received in the limiting slot.

8. The electric meat shredding apparatus according to claim 6, wherein the first shredding assembly comprises an anti-slip member which is disposed at a bottom of the first shredding member and is configured to prevent movement of the first shredding assembly.

9. The electric meat shredding apparatus according to claim 8, wherein the anti-slip member is a rubber pad or a suction disk.

10. The electric meat shredding apparatus according to claim 1, wherein a portion of the output shaft that extends out of the receiving box is sleeved by a polygonal column, the second shredding member defines an alignment slot on a side of the second shredding member that contacts the output shaft; a shape of the alignment slot is adapted to an outer contour of the polygonal column, the polygonal column is capable of being embedded into the alignment slot.

11. The electric meat shredding apparatus according to claim 1, further comprising a meat placing tray, wherein a plurality of through holes are defined in a bottom of the meat placing tray, the plurality of first spikes or the plurality of second spikes are configured to pass through the plurality of through holes respectively to enable the meat placing tray to be detachably mounted on the first shredding member or the second shredding member.

12. The electric meat shredding apparatus according to claim 1, further comprising:
a detection module, mounted on the first shredding assembly or the second shredding assembly and configured to detect whether the first shredding member and the second shredding member are separated from each other;
a control module, electrically connected to the detection module and the drive member, wherein the control module is configured to control, when the first shredding assembly and the second shredding assembly are separated from each other, the drive member to stop operating.

13. The electric meat shredding apparatus according to claim 12, wherein the detection module is a contact switch or a sensing device.

14. The electric meat shredding apparatus according to claim 12, further comprising a rotation speed adjustment module, which is electrically connected to the control module and the drive member is configured to adjust a rotation speed of the drive member.

15. The electric meat shredding apparatus according to claim 1, further comprising a battery, which is mounted inside the receiving box and is configured to supply power to the drive member.

16. The electric meat shredding apparatus according to claim 1, wherein the first shredding member and/or the second shredding member are made of a light-transmitting material.

17. The electric meat shredding apparatus according to claim 1, wherein for each spike of the plurality of first spikes or the plurality of second spikes, the spike comprises a plurality of blades, and the plurality of blades are connected to each other to form a converging portion, the converging portion extends along a center axis of the spike.

* * * * *